United States Patent [19]
Marshall

[11] 3,744,142
[45] July 10, 1973

[54] TIMING GAGE
[75] Inventor: George L. Marshall, Warwick, R.I.
[73] Assignee: Central Tool Co., Inc., Cranston, R.I.
[22] Filed: Feb. 17, 1972
[21] Appl. No.: 227,086

[52] U.S. Cl......... 33/181 AT, 33/172 R, 33/DIG. 15
[51] Int. Cl. ............................................. G01b 5/14
[58] Field of Search................ 33/180 AT, 181 AT, 33/DIG. 5

[56] References Cited
UNITED STATES PATENTS
1,683,710  9/1928  Zitzmann...................... 33/DIG. 15
FOREIGN PATENTS OR APPLICATIONS
130,195  7/1919  Great Britain................. 33/DIG. 15

*Primary Examiner*—Louis R. Prince
*Assistant Examiner*—Charles E. Phillips
*Attorney*—William W. Rymer

[57] ABSTRACT

There is disclosed a timing gage in which male threads are provided to engage the threads above an internal combustion engine piston ordinarily used to accept a spark plug, and a dial gage mounting hole is provided, the parts being so related that the axis of the mounting hole is at an acute angle to the axis of the threads, and the threads are interrupted by an opening which permits passage of a dial gage plunger.

1 Claim, 2 Drawing Figures

TIMING GAGE

SUMMARY OF THE INVENTION

The invention provides a timing gage in which a hole to carry a dial gage and a male thread portion to engage spark plug acceptor threads above an internal combustion engine piston are positioned with their axes in an acute angle relationship; the male thread portion being interrupted by an opening which permits a dial gage plunger to pass through it. In preferred embodiments, the opening is a slot, the hole is carried on an arm with an arcuate slot cooperating with a fastener on an arm-carrying unit to permit selective adjustment of said acute angle, and the arm-carrying unit comprises an adaptor bearing said male thread portion and a member fastened to it and carrying the said fastener. Easy and accurate measurement of proper timing dimensions of a piston below top dead center is made possible, with a device which is simple, rugged, and inexpensive.

BACKGROUND OF THE INVENTION

This invention relates to engine timing gages.

As is well known in the art, the spark should be delivered to the compressed mixture of air and gasoline above an internal combustion engine piston at a particular position in its movement in its cylinder. The farthest position reached by the piston during compression and before reversing direction is called "top dead center," and the position at which the spark should be delivered is specified (as by engine manufacturers) as a distance below top dead center.

It is known in the art that one useful way to determine the desired distance, when the thread designed to accept the spark plug is coaxial with (or has its axis parallel to that of) the cylinder, is to remove any spark plug therein, replace it with an adaptor having a similarly male threaded end and annular in cross section, and insert a dial gage fitted with a specially long tip through the adaptor so that when a locking screw carried in the adaptor secures the dial gage against movement the tip extends into the cylinder for engagement with the outer piston surface, following which the dial gage can be zeroed at top dead center, and the desired position found by backing the piston away until the appropriate amount is indicated on the dial gage.

If the axis of the spark plug threaded hole into the cylinder is at an angle to the cylinder axis, the device just described becomes much less practical. Even if the top surface of the piston is flat, triangulation calculations are necessary to convert between distance below top dead center and dial gage readings, with consequent waste of time and possibility of error even for those who know how to do the calculations. Likelihood of error is further increased if the piston outer surface is domed.

The special problem of cylinders with their female spark plug threads along an axis defining an acute angle with the cylinder axis has evoked efforts to design devices to indicate piston position in that situation (e.g., Griffiths U. S. Pat. No. 2,567,430 and Stroup U. S. Pat. No. 2,426,955).

BRIEF DECRIPTION OF THE DRAWING

FIG. 1 is a partial side elevation view, partially broken away along a vertical plane; and FIG. 2 is a view, broken away, at 2—2 of FIG. 1.

DESCRIPTION OF THE PREFERRED EMBODIMENT

Figure 1:
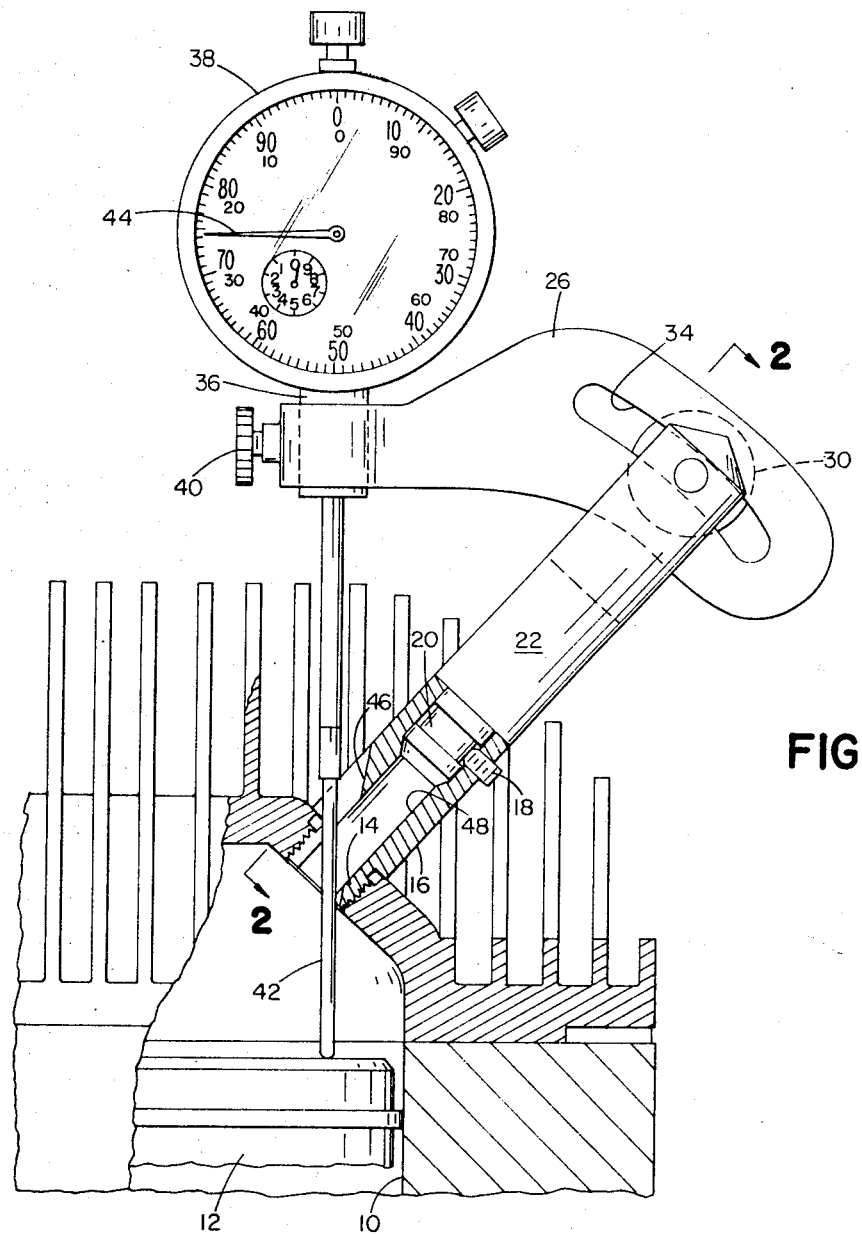
Figure 2:
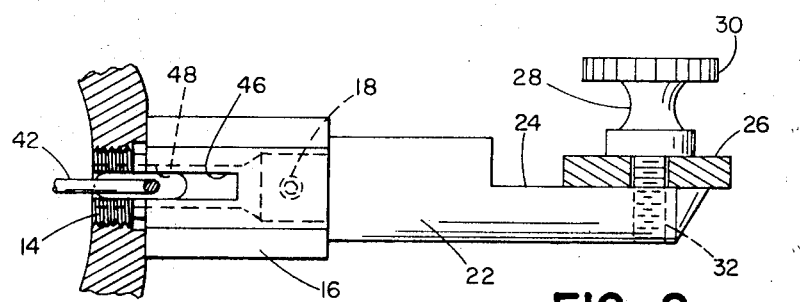

There is shown in FIG. 1 a cylinder 10 within which is reciprocably mounted piston 12. Screwthreadedly secured in the female spark plug threads above the piston 12 is male threaded portion 14 of adaptor 16, which is secured by set screw 18 to the flange 20 of member 22, which has a flat portion 24 which rests against arm 26. Arm 26 is carried by the arm-carrying unit comprising adaptor 16 and member 22, and is held against flat portion 24 by fastener 28, which has a knurled handle 30, and a male screw threaded portion 32 which engages female threads in member 22. Extending through arm 26 is an arcuate slot 34 movable relative to the member 22 and fastener 28 when the latter is loosened. Flange 36 of dial gage 38 is slidable in a hole extending vertically through arm 26, until selectively fixed in position by the tightened fastener 40. Dial gage plunger 42 is axially movable to rotate the dial gage needle 44 an amount indicating the distance moved. Slot 46 in adaptor 16 interrupts the threads of the threaded portion 14, permitting plunger 42 to pass through slot 46. The axes of male threaded portion 14 and of the dial gage accepting hole are in substantially (so that the plunger 42 will pass through the opening 46) the same plane, their axes as imaginarily extended intersecting therein in an acute angle.

In operation, the adaptor 16 is screwed into the spark plug receiving threads with slot 46 up, and the member 22 and the other parts assembled as shown in FIG. 1, the plunger 42 with its axis parallel to the axis of the piston 12. The piston 12 is then raised to top dead center, and the dial gage 38 set to zero there. The piston can then be lowered the prescribed timing setting distance by reading directly off the dial gage 38, making triangulation calculations unnecessary. The slot 34 is of such length that spark plug thread axes of from 40° to 60° above horizontal can be accommodated.

The dial gage flange 36 can be secured directly into adaptor 16, with a plunger like plunger 42 (although shorter) extending coaxially through the hole 48 in engines in which the spark plug threads are about an axis parallel to or coaxial with the piston axis.

Other embodiments within the invention will be apparent to those skilled in the art.

What is claimed is:

1. A dial gage support for use with a dial gage having a mounting flange and a feeler member movable through said flange useful in timing different internal combustion engines characterized by spark plug holes entering cylinders in different directions with respect to a piston which comprises:

a dial gage support arm comprising a first end portion and a second end portion, said first end portion containing a dial gage flange accepting hole therethrough and said second end portion containing an angle adjustment slot therethrough;

an arm-carrying member including toward a first end thereof fastening means extending through said angle adjustment slot and at a second end thereof a mounting flange said dial gage mounting flange and said arm-carrying member mounting flange being the same size; and an adaptor with a hole extending longitudinally therethrough, said hole at one end of said adaptor being of a size to accommodate seatingly said mounting flange and said dial gage flange and being throughout of size to pass said feeler member, said adaptor carrying male screw threads of the same size as a spark plug threads at the other end thereof, and said adaptor including toward said other end thereof a longitudinally extending slot, said slot extending through one wall of said adaptor from the outside thereof and communicating with said hole in said adaptor;

whereby, when a spark plug hole enters a cylinder at an angle an engine may be timed by screwing in said adaptor, securing said arm-carrying member in said hole in said adaptor at one end thereof, moving said dial gage support arm relative to said arm-carrying member a variable amount depending on the said angle involved until the dial gage, mounted in said accepting hole, has said tip extending in the same direction as the axis of the cylinder, and through said slot in said adaptor and out the open other end of said adaptor, and securing this relationship through said fastening means, and when a spark plug hole enters a cylinder with both the spark plug hole and the cylinder extending in the same direction an engine may be timed by mounting said dial gage flange directly in said first end of said adaptor, said tip extending longitudinally through said adaptor, whereupon in all the instances specified a direct reading of distance in relation to cylinder top dead center may be had with accuracy and simplicity.

* * * * *